(12) United States Patent
Wilson et al.

(10) Patent No.: US 11,173,839 B2
(45) Date of Patent: *Nov. 16, 2021

(54) CAMERA DEVICE AND MOTOR VEHICLE THEREWITH

(71) Applicant: SMR Patents S.à.r.l., Luxembourg (LU)

(72) Inventors: Douglas Wilson, Troy, MI (US); Vincent Wilson, Hampshire (GB)

(73) Assignee: SMR Patents S.à.r.l., Luxembourg (LU)

( * ) Notice: Subject to any disclaimer, the term of this patent is extended or adjusted under 35 U.S.C. 154(b) by 1 day.

This patent is subject to a terminal disclaimer.

(21) Appl. No.: 16/850,505

(22) Filed: Apr. 16, 2020

(65) Prior Publication Data

US 2020/0238910 A1     Jul. 30, 2020

Related U.S. Application Data

(63) Continuation-in-part of application No. 16/050,817, filed on Jul. 31, 2018, now Pat. No. 10,710,513.

(30) Foreign Application Priority Data

Aug. 1, 2017 (DE) ..................... 10 2017 117 403.6

(51) Int. Cl.
*B60R 1/00* (2006.01)
*B60S 1/04* (2006.01)
*F16H 25/20* (2006.01)
*H04N 5/225* (2006.01)
(Continued)

(52) U.S. Cl.
CPC ....... *B60R 1/00* (2013.01); *B60S 1/04* (2013.01); *F16H 25/20* (2013.01); *H04N 5/2252* (2013.01); *H04N 5/22521* (2018.08); *H04N 5/23229* (2013.01); *H04N 7/18* (2013.01); *B60R 2300/10* (2013.01); *B60R 2300/20* (2013.01); *B60R 2300/30* (2013.01); *F16H 2025/2081* (2013.01)

(58) Field of Classification Search
CPC ... B60R 11/04; B60R 1/074; B60R 2011/004; B60S 1/528; B60S 1/0818
USPC ........................................................ 348/135
See application file for complete search history.

(56) References Cited

U.S. PATENT DOCUMENTS

2013/0215271 A1* 8/2013 Lu ..................... B60R 13/005
                                                     348/148

FOREIGN PATENT DOCUMENTS

DE      10 2008 008 656 A1      8/2009
DE      10 2008 012 033 A1      9/2009
(Continued)

OTHER PUBLICATIONS

German Office Action dated May 4, 2018 of German application No. DE 10 2017 117 403.6.

*Primary Examiner* — On S Mung
(74) *Attorney, Agent, or Firm* — Jones Day

(57) ABSTRACT

A camera module for use in a vehicle includes a camera for capturing a surrounding of the vehicle, and which is configured to move from a retracted position to a deployed position, a camera lens forming a housing or part of the housing around the camera, a camera holder which carries the camera and the surrounding camera lens, and a drive system including a motor for moving the camera from the retracted position to the deployed position or from the deployed position to the retracted position.

26 Claims, 6 Drawing Sheets

(51) Int. Cl.
*H04N 5/232* (2006.01)
*H04N 7/18* (2006.01)

(56) References Cited

FOREIGN PATENT DOCUMENTS

DE 10 2014 015 914 A1 10/2015
EP 2525029 7/2017

* cited by examiner

CAMERA DEVICE AND MOTOR VEHICLE THEREWITH

CROSS-REFERENCE TO RELATED APPLICATIONS

This application is a continuation-in-part of U.S. patent application Ser. No. 16/050,817, filed Jul. 31, 2018, which claims the benefit of foreign priority to German Patent Application No. DE 10 2017 117 403.6, filed Aug. 1, 2017, each of which is herein incorporated by reference in its entirety for all purposes.

BACKGROUND

1. Field

The following description relates to a camera device for a motor vehicle and a motor vehicle with such a camera device.

2. Description of Related Art

Modern motor vehicles are fitted with an increasing amount of peripheral devices, such as external rear view devices with one or more reflective elements, external cameras, sensors and/or electronic toll payment systems.

Different functions and devices can be incorporated into and/or controlled with the help of rear view devices. For example, such functions and devices may enhance, extend and/or sustain the functionality of the rear view device during normal or extreme conditions. This may include heating and/or cooling means, cleaning means such as wipers, liquid and/or gaseous sprays, actuator means for moving the rear view device or parts of it, such as a display, a camera system and/or parts of a camera system, including for example lenses, filters, light sources, adaptive optics like deformable mirrors, sensors and/or mirrors, and/or actuator means for inducing movement of other objects, for example parts of the vehicle and/or objects surrounding the vehicle. Furthermore, it may include linear tracks and/or rotating wheels such as a filter wheel, for exchanging optical elements, including for example lenses, mirrors, light sources, sensors, adaptive optics like deformable mirrors and/or filters.

Other examples for functions and devices incorporated into and/or controlled with the help of rear view devices include illumination devices such as any kind of light module like an external light module, an internal light module, a front light, a back light, a fog light, a brake light, an acceleration light, a turn signal, a logo lamp, a puddle light, a flash light, a navigation light, a position light, an emergency light, a spotlight, a green light, a red light, a warning light, a turn signal light module, an approach light, a search light, an information light, a display and/or any combination thereof.

Further examples for functions and devices incorporated into and/or controlled with the help of rear view devices may include a tiredness detection system, a microsleep detection system, a distance and/or velocity determination system such as a LIDAR (Light detection and ranging) system, a blind spot indicator system, a lane change assistant system, a navigation assistant system, a tracking assistant system, a human-machine interaction system, a machine-machine interaction system, an emergency and precaution assistant system, such as an accident avoiding assistant system, a counter-measures assistant system, a brake assistant system, a steering assistant system, an acceleration assistant system, an escape assistant system including for example an ejection seat system, a direction indicator, a blind spot indicator, an approach system, a strong braking system, an emergency braking system, a charging status indicator, a vehicle mode system, including for example a sports mode system, an economy mode system, an autonomous drive mode system, a sleep mode system and an anti-theft system, a vehicle locked indicator system, a vehicle stolen indicator, a warning signal system, a temperature indicator system, a weather indicator system, a traffic light signal system, a fuel status system and/or any combination thereof.

A camera module to be used in a rear view device may include a plurality of different optical elements, including a variety of sensors and light sources, as well as housing parts. The housing of a camera module can be made out of plastic, metal, glass, any other suitable material and/or any combinations thereof and can be used in combination with the techniques described below to change or modify the properties of the material or the material surface. Housings are, for example, described in German patent application No. 102016108247.3. Further, the camera may include for example CCD or CMOS or light field sensors, as for example described in German patent application No. 102011053999. Also an area of the sensor can be reserved for different purposes, for example to detect a test beam, as described in U.S. Pat. No. 8,031,224. The camera module can also be equipped with apparatuses for light intensity adjustment as described for example in U.S. patent application Ser. No. 14/809,509 and light level intensifier tubes as described in U.S. patent application Ser. No. 09/771,140. Still further, the camera module or a cover adapted to the camera module can be moved using different actuators, drives and/or a flexible track, such as described in German application No. 102016108247.3.

The camera module may also include cleaning elements to clean the optical element facing outwards and being exposed to the environment. The cleaning element may, for example, include wipers, brushes, lips, nozzles, fans and similar elements as are described in European patent application No. 14165197.6, European patent application No. 13163677.1, and European patent No. 1673260. The cleaning devices are not limited in composition, and may for example comprise any fabric, elastomeric, sponge, brush, or combination of these. Special wiper elements including wiper arms, wiper blades, wiping cloth, wiping tissue and combinations thereof are described in European patent application No. 14165197.6. A reservoir for holding a cleaning liquid is described in European patent application No. 14165197.6. Such a reservoir can be attached to or integrated into the camera module to provide the cleaning liquid to the optical elements of the camera module. Different methods may be used to detect dirt or other obscurations preventing or reducing the functioning of the camera module, such as described in U.S. Pat. No. 8,395,514, European patent No. 1328141, and U.S. Pat. No. 8,031,224. Also, light sources can be installed or integrated into the camera module to increase the visibility of surrounding objects, measure distances and directions and detect dirt, such as described in U.S. Pat. No. 8,031,224, U.S. patent application No. 62/470,658, and U.S. patent application Ser. No. 09/771,140.

Different heating means such as heating coils, heating devices integrated into the lens holder or the bezel, or other heating elements can be used to impede condensation and icing at the surface of optical elements. This is described, for example, in German patent application No.

102016108247.3, U.S. patent application No. 62/470,658, and German patent application No. 102016107545.0.

A watertight seal against weather effects, as well as against the influence of washing processes with detergents, solvents and high pressure cleaners can be used on the housing of the camera module as described in U.S. patent application Ser. No. 13/090,127. Alternatively, the housing can be made of a body including plastic and conductive material, wherein the conductive material is dispersed in the plastic material to form a conductive mass to allow a power source, preferably a DC voltage source, to connect via at least two electrodes to the body and heat the body accordingly, as described in German patent application No. 102016107545.0. Different types of fixings can be used to fix the camera module to the vehicle or other components, such as the snap-fit connection described in European patent No. 2233360.

Shape memory alloys (SMA) are used for various functions with rear view devices. European patent application No. 3098444 relates to an actuator device for a rear view device of a motor vehicle including at least one retaining element, at least one adjusting element which can be transferred into a plurality of functional positions. For example, the adjusting element may be transferred from a basic position into at least one end position. At least one driving means may include at least one shape-memory element which is in the form of a wire which extends between the retaining element and the adjusting element and can be or is secured to both. The extension of the shape-memory element can be modified upon being actuated, such as being electrically energized, and by means of the modification of the extension of which the at least one adjusting element can be transferred from one functional position into another functional position. For example, from the basic position into the end position or vice versa. At least one heat-conducting means may lie in contact with the driving means at least in the end position of the adjusting element, and the at least one switching means by means of which the at least one driving means and the at least one heat-conducting means can be arranged with respect to one another with no contact in the basic position of the adjusting element and/or by means of which the at least one driving means and the at least one heat-conducting means can be or are arranged touching one another at least in sections in the end position of the adjusting element. A further actuator for an exterior rear view mirror of a vehicle is described by European patent application No. 2781743 and has at least one actuator pin, at least one drum body enclosing a cavity in which the actuator pin can be arranged or is arranged in a non-rotational manner, at least one clamping means which includes at least one shape-memory element which can be fixed or is fixed to the drum body and with which the drum body can be moved in a first rotational direction, and at least one return means which includes at least one shape-memory element which can be fixed or is fixed to the drum body and with which the drum body can be moved in a second rotational direction. The clamping means and/or the return means may be fixed or are fixed on a winding portion of the drum body and in the winding portion of the drum body at least quarter of a winding, in particular at least half a winding, in particular an entire winding, in particular several windings are applied.

Obstructions and dirt deposits on an outer optical element of a vehicle rear view or vision systems can seriously impede the effectiveness and function of the same. Because exterior rear view or vision systems on vehicles provide a legal and safety feature, every effort to minimise any visual obstacle has high benefit. There is a significant increase in the amount of camera monitoring and vision systems that are included on modern vehicles. One goal by many automotive manufacturers is to replace existing traditional glass mirror based systems with high tech camera monitoring solutions. This is to improve vehicle aesthetics and aerodynamic quality while also adding further features to vehicles. Many of the conceptual ideas however still show mirror replacement cameras as external positioned components.

Cleaning means for a camera module of a motor vehicle may be effective in keeping vision systems free of any kind of obstruction provided by debris, dirt, dust, water droplets, snow, ice and the like. Typically, for traditional exterior mirrors, the driver has simply cleaned the glass surface manually when vision is impaired. For camera based systems, such a manual cleaning is not practical in particular when a plurality of camera systems are used. With deployable camera modules, which assist in damage protection, a manual cleaning becomes even more troublesome.

Several camera cleaning systems have been developed. For example, see International patent application No. PCT/EP2017/060104. This known cleaning system for a camera lens includes a cover adapted to at least partially enclose at least one camera having at least one camera lens; drive means adapted to rotationally move the cover relative to the camera; and a housing adapted to hold the cover and the drive means, where the housing at least partially encloses the cover and includes at least one opening for allowing electromagnetic radiation to pass through the cover to the lens. The cover may include essentially transparent and/or essentially scratch-proof material, preferably the cover comprises Gorilla-Glas™. The drive means may include a motor and/or a turbine. Still further, at least one cleaning device which is adapted to clean an outer surface of the cover and includes at least one brush, at least one lip, at least one nozzle and/or at least one fan, can be part of the known cleaning system.

Moving a camera module attached to a motor vehicle typically leads to noise generation. This can be a disadvantage due to several reasons. First, noise can scare and/or disturb humans as well as animals inside the motor vehicle as well as close by. It is often regarded as environmental pollution, similar to light, odors, pollutants and waste, therefore there is a need for reducing noises. Second, generating noise means that part of the energy applied to move the camera module is converted into mechanical vibrations and/or friction. This leads not only to an increased mechanical stress of the parts, and therefore to a reduced lifetime of the components, but also to an increased amount of heat and a reduced energy efficiency. This increases costs and additionally burdens the environment.

For example, US patent application No. 2014/0211010 A1 describes a deployable camera system including a body defining a cavity therein, and a camera including a housing having an exterior surface. The camera may reversibly transition between a retracted state or stowed position in which the camera is recessed into the cavity and the exterior surface is substantially flush with the body, and a deployed state or position where the camera protrudes from the cavity and the exterior surface is not substantially flush with the body. The known deployable camera system includes a shape memory alloy element which may transition between a first state and a second state in response to a thermal activation signal.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In an aspect, a camera module for use in a vehicle includes a camera for capturing a surrounding of the vehicle, and which is configured to move from a retracted position to a deployed position; a camera lens forming a housing or part of the housing around the camera; a camera holder which carries the camera and the surrounding camera lens; a camera cap which is configured to be flush with a vehicle surface in response to the camera being in the retracted position so that the camera is completely retracted beneath the vehicle surface; and a drive system including a motor for moving the camera from the retracted position to the deployed position or from the deployed position to the retracted position.

In another aspect, a camera module for use in a vehicle, includes a camera for capturing an image surrounding the vehicle, and which is configured to move from a retracted position to a deployed position; a camera lens forming a housing around the camera; a camera holder which carries the camera and the surrounding camera lens; a camera lens cleaner which is fixed in an opening of the vehicle surface so that the camera lens is cleaned as the camera moves from the retracted position to the deployed position or from the deployed position to the retracted position; and a drive system comprising a motor for moving the camera from the retracted position to the deployed position or from the deployed position to the retracted position.

In another aspect, a camera module for use in a vehicle, includes a camera for capturing a surrounding of the vehicle, and which is configured to move from a retracted position to a deployed position; a camera lens forming a housing or part of the housing around the camera; a camera holder which carries the camera and the surrounding camera lens; a camera cap which is configured to be flush with a vehicle surface in response to the camera being in the retracted position so that the camera is completely retracted beneath the vehicle surface; and a drive system comprising a motor for moving the camera from the retracted position to the deployed position or from the deployed position to the retracted position, wherein the housing around the camera comprises at least one of an opaque shield and a substantially reflective material on a surface.

In another aspect, a camera device for a motor vehicle that makes use of a deployment system with reduced noise generation and/or enhanced cleaning capabilities is provided.

A camera device for a motor vehicle with a vehicle body having a cavity may include a camera module with a module body having at least one aperture, at least one sensor adapted to detect electromagnetic radiation of at least one specific spectral range and being arranged within the module body such that electromagnetic radiation can reach the sensor when passing the aperture, and at least one optical element mounted to substantially cover, fill or close the aperture, a deployment system for moving the camera module between a retracted state, in which at least the optical element is arranged within the cavity of the vehicle body, with preferably the outer surface of the camera module body being generally flush with the exterior of the vehicle body, and a deployed state, in which the camera sensor is operable and at least the optical element protrudes from the vehicle body, and a cleaning means for cleaning the optical element during a movement of the camera module between the retracted state and the deployed state.

The optical element may include at least one lens, light window, glass plate, transparent cover, semi-transparent cover, a scratch-proof cover, filter, wave plate, beam splitter, polarizer, diffuser, mirror element, prism, window, beam displacer, grating and/or holographic plate.

The deployment system may include at least one low-noise actuator, which is selected from a group comprising an electrical actuator, an electromagnetic actuator, a shape memory alloy (SMA) actuator and/or a piezo actuator.

The cleaning means may include at least one static cleaning means, which does not move with the camera module, and/or the cleaning means may include at least one moving cleaning means which moves together with the camera module, and/or the cleaning means may include at least one mechanical cleaning means for contacting the optical element when the camera module is moved between the retracted state and the deployed state, and/or the cleaning means may include at least one active cleaning means for cleaning the optical element by applying a cleaning fluid, with the active cleaning means preferably comprising at least one nozzle, and/or at least a part of the cleaning means, preferably the nozzle, can be moved relative to the module body and/or the vehicle body.

Camera devices may also include sealing means for sealing the camera module body within the vehicle body at least in the retracted state, with the mechanical cleaning means and the sealing means being connected or provided together.

The camera device may further include actuation means for manually activating the movement of the camera module and/or of the cleaning means and/or for manually activating a cleaning action of the cleaning means, with preferably the actuation means being provided on the camera module body.

The camera device of the invention may include heating means in thermal contact with the optical element.

The camera device may also include at least one information and/or warning element, in particular including a display module and/or a light module preferably provided on the camera module body. The information and/or warning element can be arranged within the cavity of the vehicle body in the retracted state and/or can be discernible from the outside of the vehicle body at least in the deployed state, and/or the information and/or warning element can be cleaned by the cleaning means.

The camera device may include a sound system, preferably comprising a noise cancellation system. The sound system may include at least one microphone for detecting sound waves and/or at least one loudspeaker for outputting sound waves, in particular for compensating detected sound waves.

The camera devices may include a control unit for controlling the deployment system, the cleaning means, at least its active cleaning means, the heating means, the sound system and/or the information and/or warning element. The control unit can determine the degree of soiling and/or cleaning, in particular of the optical element, and/or the control unit can receive signals from the actuation means, at least one dirt sensor, the clock, the counter and/or a vehicle component.

A motor vehicle may include at least one display system in connection the sound system of the invention.

The vehicle body may be provided with a cavity for receiving at least a part of the camera device, with the static cleaning means, the sealing means, the heating means and/or the sound system being attached to the outside of the vehicle body or within the cavity, and/or with the deployment system being arranged within the cavity.

The control unit may be connected to the vehicle engine control unit and/or electronic engine management system, or the control unit may be provided by the vehicle engine control unit and/or electronic engine management system.

The control unit may receive signals from the actuation means, the dirt sensor, the clock, the counter, a sensor and/or camera unit and/or the vehicle component, with the vehicle component being a part of a locking system, a windshield cleaning system, a head lamp cleaning system, a back lamp cleaning system, an engine system, a braking system and/or display system.

To reduce and even substantially avoid noise generation as well as mechanical vibrations and/or friction, the deployment system of the camera device may use a low-noise actuator, in particular an electrical actuator, an electromagnetic actuator, a shape memory alloy (SMA) and/or a piezo actuator, to move the camera module. The movement of the camera module may follow the same pattern as many traditional exterior mirrors found on vehicles which are often referred to as powerfold mirrors, in particular automatic electric powerfold mirrors. In detail, the camera module may be moved between a retraced state, in which the camera module is stowed away in a cavity of a vehicle body, with preferably the outer surface of the camera module being generally flush with the exterior of the vehicle body, retaining a sleek vehicle styling, and a deployed state, in which the camera module is operable and protruding from the vehicle body. Alternatively or additionally, an active noise cancellation system may be used to reduce the noise generated by one or more actuators.

To protect the camera device from vandalism, the deployable systems may be positioned within the vehicle body. Also the optical element of the camera may be arranged within the cavity in the retractable state.

This placement may also improve the overall sleek look of the vehicle from a design and styling perspective.

To assist with the cleaning of the camera optical element, the optical element may be cleaned when the camera is moved from the retracted state to the deployed state and vice versa. Such a cleaning action must not take place during each movement, but might be restricted to, for example, only the deployment movement.

The optical element may be provided by a lens, and the lens may be washed by an integral fine spray water jet and then can pass over a series of wiper blades to remove any debris.

To further assist in cleaning, the fine spray water jet may be activated by the driver of the motor vehicle. This may be linked to the windscreen and/or head lamp washer jet system for activation. For example, every fifth pull of standard washer jet system can trigger the cleaning means of the camera device, for example, by activating a fine spray water jet. Applying a fine water jet spray to the camera outer optical element aims to reduce and remove any contaminants and debris picked up whilst in transit between the retraced state and the deployed state.

The camera module may be placed within a housing that forms part of the outer vehicle body work. This can be positioned anywhere on the vehicle, such as on the side of the vehicle, so that the optimum vision angles can be achieved. The camera module can be automatically brought into a drive position defined by the deployed state during unlocking the motor vehicle and/or starting its engine, while movement into the retracted state can be triggered when stopping the engine and/or locking the same. During these procedures the camera module may receive a movement activation signal via an ECU or other control unit.

The optical element is not restricted to a lens. For example, it may include various different elements used in optics, such as glass or other types of transparent or semi-transparent plates, filters, waveplates, beamsplitters, polarizers, diffusers, mirrors, prisms, windows, beam displacers, gratings, holographic plates and/or any combinations thereof.

Although typically a camera module works with the visible range of the electromagnetic spectrum, the invention is not limited thereto and it may be applied to other ranges of the electromagnetic spectrum. A camera module may include a general device having a sensor, adapted to detect electromagnetic radiation of a certain wavelength range, and including an aperture for letting the corresponding electromagnetic radiation reach the sensor. Optical elements covering or incorporated into the aperture of the camera module may be designed depending on the corresponding wavelength range. Useful examples of wavelength ranges are, beside the visual wavelength range, within or across the ultraviolet (UV) range, the infrared (IR) range, the microwave range, the radiowave range, the X-ray range, the terahertz range, the gigahertz range, the megahertz range and the kilohertz range as well as any combinations thereof.

BRIEF DESCRIPTION OF THE DRAWINGS

The foregoing summary, as well as the following detailed description, will be better understood when read in conjunction with the appended drawings. For the purpose of illustration, certain examples of the present description are shown in the drawings. It should be understood, however, that the invention is not limited to the precise arrangements and instrumentalities shown. The accompanying drawings, which are incorporated in and constitute a part of this specification, illustrate an implementation of system, apparatuses, and methods consistent with the present description and, together with the description, serve to explain advantages and principles consistent with the invention.

Figure 1:
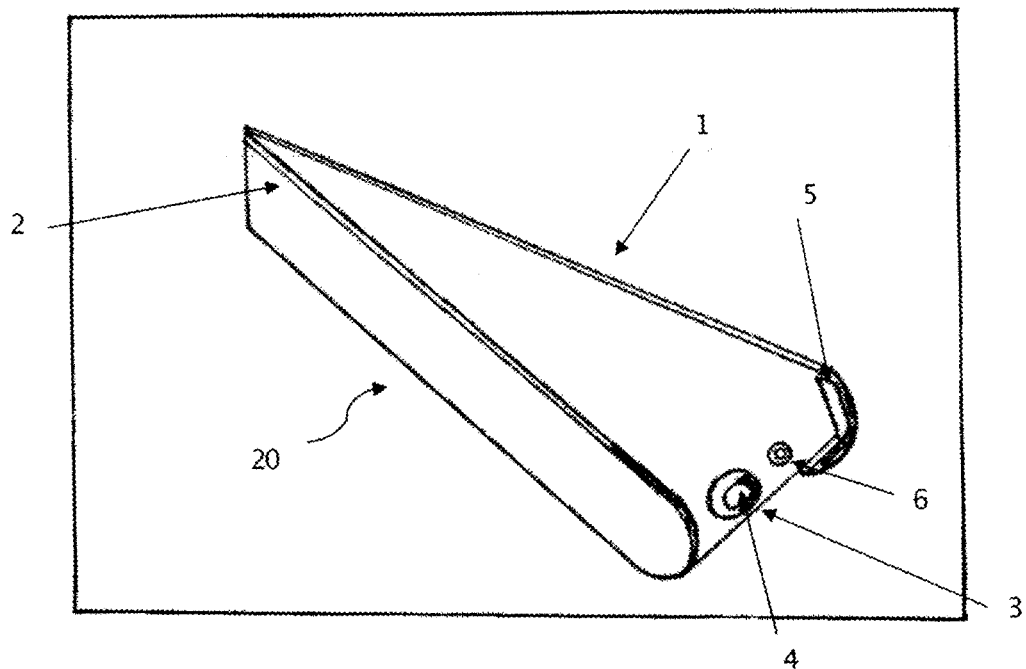
FIG. 1 is a diagram illustrating a perspective view of an example of a deployed side camera device

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the systems, apparatuses and/or methods described herein will be suggested to those of ordinary skill in the art. Also, descriptions of well-known functions and constructions may be omitted for increased clarity and conciseness.

The term "rear view" is here defined as a view of the surrounding area of the motor vehicle, which is not in the field of view of a driver, i.e. the directions opposing, left, right, below and above of the viewing direction, but can also comprise the view in the direction of the viewing direction of the driver and/or any combinations of the directions.

Figure 2:
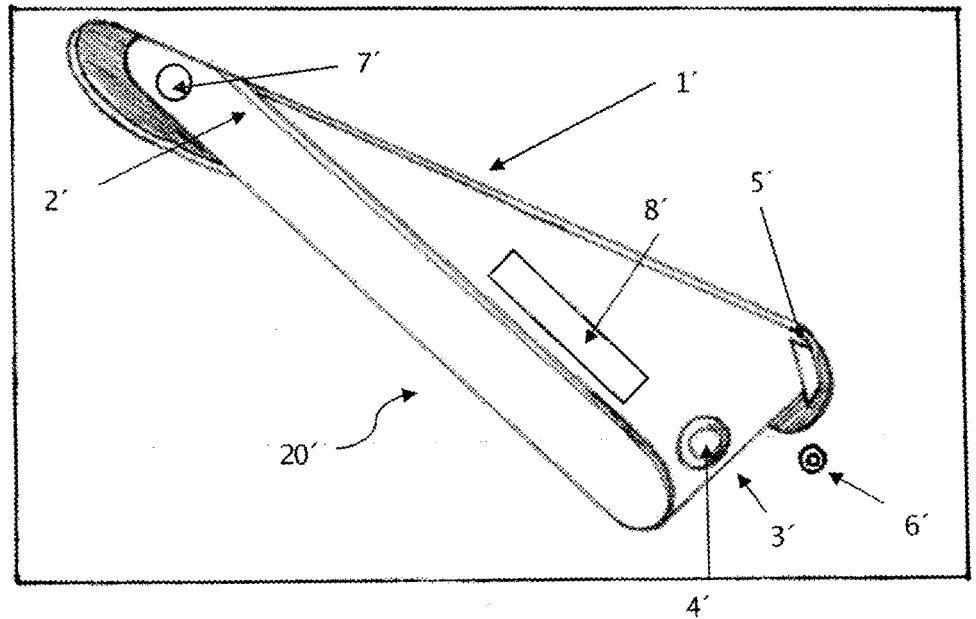
FIG. 2 is a diagram illustrating a perspective view of another example of a deployed side camera device.

FIGS. 1 and 2 each show a side of a vehicle body 1, 1' with a camera device including a moveable camera module 20, 20' in a deployed state. These two embodiments of the invention differ from each other with respect to the suspension of the camera module as well as with respect to an associated cleaning device.

Camera modules may be integrated into side parts of a vehicle body, but also into doors or exterior rearview devices.

In an example, the camera module 20 of FIG. 1 includes a camera module body 2, a sensor (not shown) for receiving electromagnetic radiation and being mounted within the camera module body 2, a camera aperture 3 within the camera module body 2 for letting electromagnetic radiation from the surrounding environment pass to reach the sensor. The camera aperture 3 is covered by a light window or another optical element 4 for guiding, filtering and/or otherwise altering the properties of the electromagnetic radiation before reaching the sensor. Properties to be altered can be the direction, the intensity the polarization, the spectral range and/or the frequency. The optical element 4 also serves for covering and/or sealing the camera aperture 3 against the outside environment. The optical element 4 preferably includes a lens.

The camera module 20' of FIG. 2 also includes a camera module body 2', a sensor (not shown), a camera aperture 3' and an optical element 4'.

Figure 3:
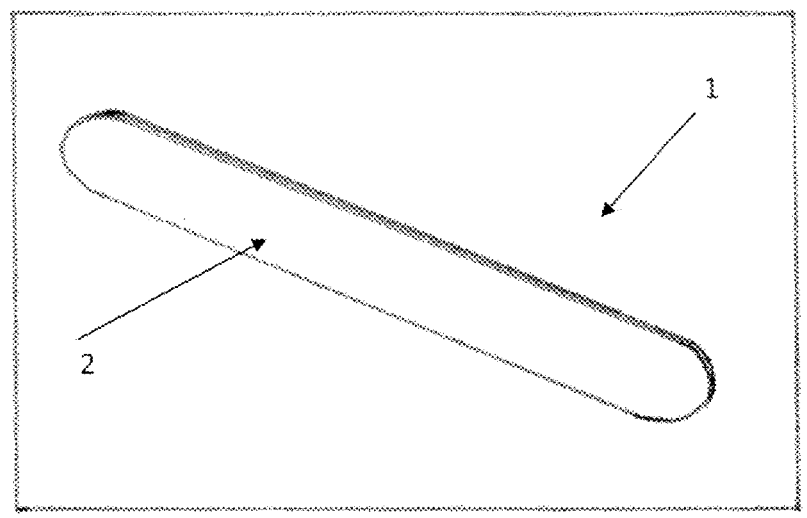
FIG. 3 is a diagram illustrating a perspective view of an example of the camera device of FIG. 1 in its retraced position within a vehicle body.

FIG. 3 shows the camera module body 2 of FIG. 1 retraced in the vehicle body 1 such that it is stowed within the vehicle body 1. In this position, the camera module 20, in particular the optical element 4, is protected against damage from the outside and against getting soiled. For an appealing appearance, the camera module body 2 may be let-in flush with the vehicle body 1.

The camera module body 2' of FIG. 2 can be stowed in an analogue manner to take its retracted position.

For the camera module 20, 20' to be able to function properly, the optical element 4, 4' has to be clean, i.e. substantially free of debris, dirt, water droplets, snow ice and other matter covering the optical element 4, 4' and, thus, hindering the electromagnetic radiation to reach the camera sensor and/or distorting its properties. To ensure that the optical element 4 is clean, different cleaning means can be used. The cleaning means may include a static cleaning means 5, 5' and an active cleaning means 6, 6'.

The static cleaning means 5, 5' may be mounted on or in the vehicle body 1, 1' in such a way that, when the camera module 20, 20' changes between the retraced state and the deployed state, the optical element 4, 4' comes at least partly in contact with the static cleaning means 5, 5'. With such a relative movement debris covering the optical element 4, 4' is mechanically removed by wiping or the like.

Exemplarily shown in FIGS. 1 and 2 is a static wiper blade system as static cleaning means 5, 5', which can be provided as part of an internal rubber housing. The internal rubber housing may also ensure a sealing between the vehicle body 1, 1' and the camera module body 2, 2' when the camera module 20, 20' is in the retraced state, and can even seal at least partially the cavity provided within the vehicle body 1, 1' for the camera module 20 20', when the same is in the deployed state.

The static cleaning means 5, 5' may be selected from various forms and materials. For example, the static cleaning means 5, 5' may include wipers, in particular with wiper arms, wiper blades, wiping cloth, wiping tissues, brushes, lips and combinations thereof. In addition, any fabric, rubber, elastomeric, fiber or sponge material may be used. At least one important feature, for example, is that the static cleaning means 5, 5' will automatically effect a cleaning when the camera module body 2, 2' changes between the retracted and the deployed state. This can happen as a result of a vehicle function being activated, for example locking or unlocking of doors, driving forwards or backwards, activating a display device of the vehicle and/or manual activation of a movement of the camera module body 2, 2' by the driver. The embodiment of FIG. 2 is provided with a push bottom 7' for such a manual activation.

The active cleaning means 6, 6' may also include various means for actively cleaning the optical element 4, 4'. In the embodiments of FIGS. 1 and 2 a nozzle is shown, which directs a jet of cleaning fluid onto the optical element 4, 4' for cleaning purposes. The cleaning fluid can be chosen from any suitable range of substances, for example water, ethanol, alcohol, clean water, distilled water, deionized water, ultra-pure water and any combination of the aforementioned fluids and/or a cleaning detergent. The fluid jet may also include a gas jet, such as an air jet.

In FIG. 1 the nozzle of the active cleaning means 6 is located on the camera module body 2 such that it can be activated when the optical element 4 needs to be cleaned, in both the retraced and the deployed state. Such a cleaning action can be automatically initiated via a not shown control circuit of the vehicle or manually by the driver of the vehicle. For example, the control circuit can activate a water jet to exit the nozzle when the standard washer jet system of a front windshield and/or of a head light of the vehicle is activated. An activation might also be triggered in regular time intervals and/or depending on output signals of a sensor measuring the degree of soiling of the optical element 4.

In FIG. 2, the nozzle of the active cleaning means 6' is located on the vehicle body 1', or it can be located within the cavity of the camera module body 2' (not shown). The depicted location of the nozzle is just an example and should not be regarded as limiting to this specific location. Any location in which a fluid jet from the nozzle of the active cleaning means 6' can reach the optical element 4' can be used.

Locating the nozzle on the camera module body 2 has the advantage of an easy integration of the components into the camera module 20, whereas locating the nozzle on the vehicle body 1' can change the appearance of the vehicle styling, but leaves the nozzle prone to damages from the outside. A nozzle located within the cavity of the camera module body can have the advantage that it is more easily integrated into the vehicle without the danger of receiving damage from the outside. But with such a configuration (not shown), depending on the mechanical realization of the camera deployment system, it could be possible that the cleaning of the optical element cannot not be performed when the camera module body is in the deployed state, such that the camera module body has to be retraced into the cavity for cleaning.

On the one hand, if cleaning is to be performed during operation of the vehicle, it may be an advantage to allow cleaning when the camera module is in the deployed state. On the other hand, if the camera module needs to be cleaned, the information coming from the camera module might not reliable, such that the time needed for retracing, cleaning and redeploying is not critical. One additional advantage of moving the camera module from the deployed into the retracted state for cleaning is the interaction with the static cleaning means during such a movement, which results in an enhanced cleaning effect.

One disadvantage of using only static cleaning means is that at some point of time they also have to be cleaned or replaced to fulfill a mechanical cleaning in a satisfactory manner. Due to the combination with active cleaning means, a cleaning of the static cleaning means can be automatically achieved. For example, the nozzle of the active cleaning means 6 of FIG. 1 can be used to spray a cleaning fluid onto the static cleaning means 5 while the camera module 20 is moving between the retraced and the deployed state.

In addition or alternatively, the active cleaning means can be adapted to be movable such as to allow directing a cleaning fluid jet at different directions, therefore targeting also a static cleaning means. In FIG. 1, the nozzle of the active cleaning means 6 can be adapted to implement a rotation to direct the cleaning fluid jet on the static wiper blade 5.

Depending on the location of the active cleaning means, additional active cleaning means can be employed. For example when the active cleaning means is located on the vehicle body, an additional active cleaning means can be situated inside the cavity of the camera module, such that it can also target the passive cleaning means.

A movable active cleaning means can also be used to clean other devices or parts. For example, one can place a device or part in front of or adjacent to the camera module and activate a cleaning function for example by pushing a button such that the nozzle moves not to direct the cleaning fluid onto the optical element, but towards the region in front or adjacent of the camera module and, thus, onto the device or target. For example when a mobile phone or the hands of a vehicle user are dirty, they can be cleaned in such a manner.

In another example, a human or animal may be soiling or damaging a vehicle, for example by scratching, urinating or the like. When the camera module is silently deployed, neither the human nor the animal will be aware and warned of its presence. As a countermeasure and to prevent damaging or soiling, the nozzle of an active cleaning means can then be directed at a human or animal as soon as the presence thereof is detected by a sensor (not shown) such that the cleaning detergent can be sprayed on the human or animal to scare them away.

To minimize the noise which might occur when moving the camera module 20, 20' of between the deployed state shown in FIGS. 1 and 2 the retracted state of FIG. 3, a low-noise actuator (not shown), which may include an electrical actuator, an electromagnetic actuator, a shape memory alloy (SMA) actuator and/or a piezo actuator, can be used for such a movement. In another example or additionally, an active noise cancelation system can used to reduce the noise generated by actuators needed for the movement of the camera module 20, 20'.

Noise cancellation systems typically include on the one hand microphones for analyzing the present noises, and on the other hand speakers for outputting acoustic sound waves to cancel or drown out the present noises.

One additional advantage of having at least one microphone is the possibility of noise analyses, not restricted to the actuators. Such analysis may, for example, indicate the presence of damaged or exhausted parts. For example, having a tire with a nail or having a flat tire changes the noise of the vehicle in a characteristic way. Another example is the change of noise over time, indicating an exhausted part. When the lifetime of a motor, gear, actuator or other mechanically moving or mechanically stressed part is nearly reached, often the noise emitted by that part will change in a characteristic way leading to the perception of the future failure and giving a user the option to replace that part before breaking or catastrophic failure occurs.

The camera device of the invention may also be provided with an additional element for providing information and/or warning. Such an additional element can include a display module such as display module 8' shown in FIG. 2, and/or a light module (not shown). The display module 8' can include information on the vehicle, for example the name or a logo of the manufacturer of the vehicle. It can be provided as a label, coating imprint or the like.

Any light module presently used in rear view mirrors can be integrated into a camera device. In this respect, reference is made to the light modules listed in the introduction of this specification.

The additional element can be arranged on the module body as shown in FIG. 2, such that it is only discernible in a deployed state.

As the camera module 20, 20' of the camera device functions similar as a pop up head light which can only be seen when in use, the information and/or warning message provided by the additional element attracts the attention due to this pop up effect even more.

Figure 4:
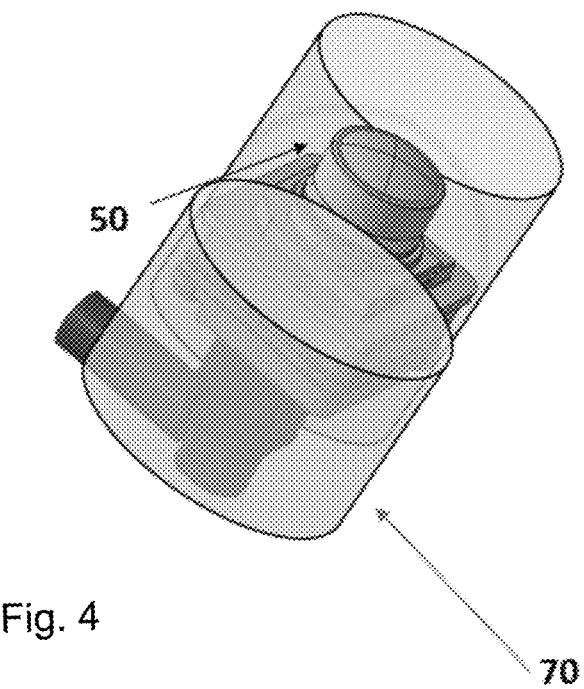
FIG. 4 is a diagram illustrating a perspective view of another example of a camera module.

FIG. 4 is a diagram illustrating a perspective view of another example of a camera module. Referring to FIG. 4, a camera module includes a camera 50 and a camera holder 70. The camera 50 may be a commercially available automotive camera or may be custom made and integrated into the camera module. The camera holder 70 receives the camera 50 and mates with a camera lens 22 which is described in reference with FIG. 5.

Figure 5:
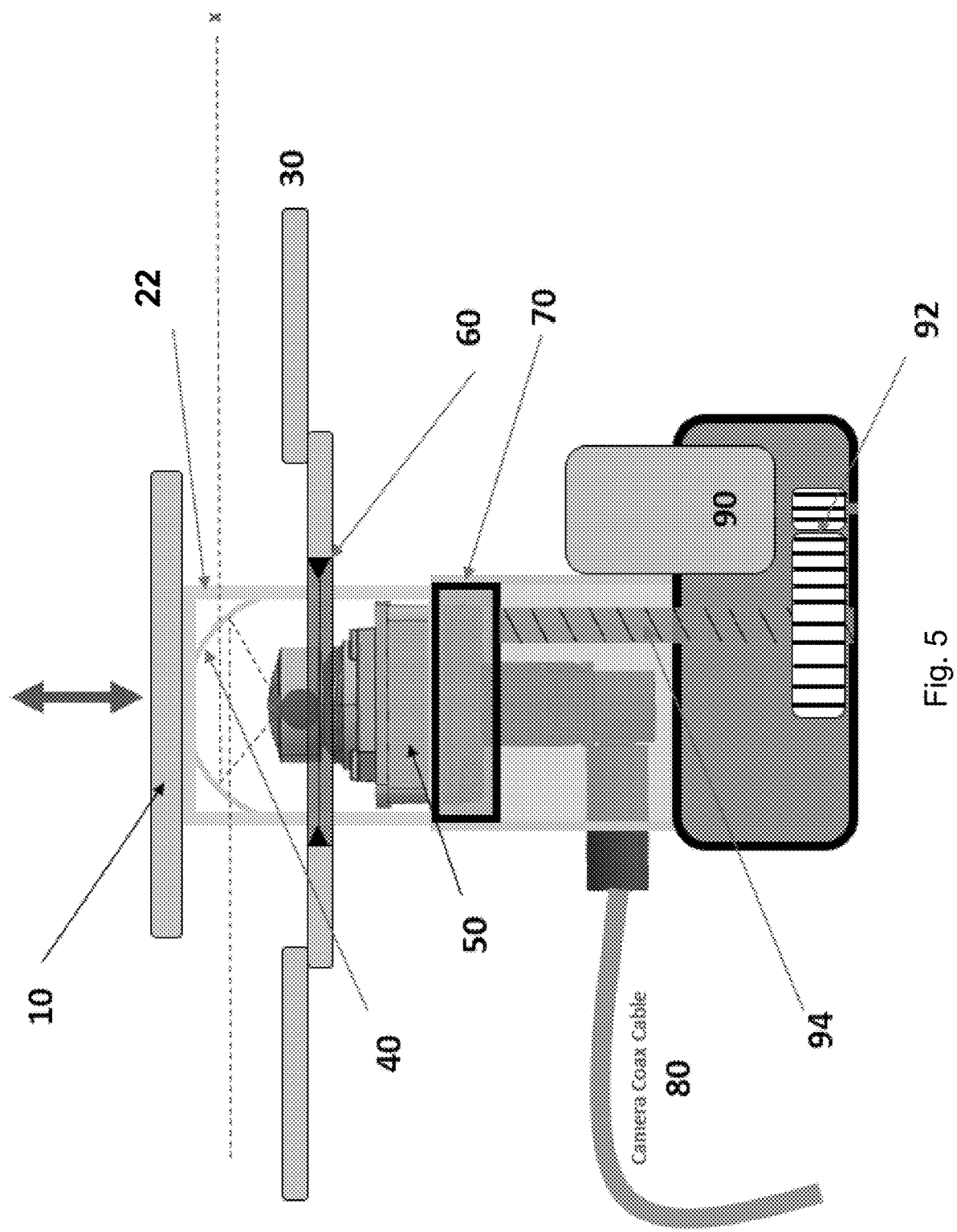
FIG. 5 is a diagram illustrating a schematic view of the camera module of FIG. 4 in a deployed position in a vehicle.

FIG. 5 is a diagram illustrating a schematic view of the camera module of FIG. 4 in a deployed position in a vehicle.

Referring to FIG. 5, the camera module is illustrated in a deployed position of a vehicle where the vehicle includes a sheet metal surface 30 and a hole is formed in the sheet metal surface 30 allowing the camera module to be mounted inside or beneath the outer surface of the vehicle formed by the sheet metal surface 30. As already described above, the camera module includes the camera 50 and the camera holder 70. The camera module also includes a camera cap 10 which may also be formed of the same sheet metal material as the sheet metal surface 30 of the vehicle. In a retracted state, as described in reference with FIG. 6, the camera cap 10 is flush with the sheet metal surface 30 so that the camera module is substantially undetectable.

Still referring to FIG. 5, the camera module includes the camera lens 22 which, in this example, is a substantially cylindrical shaped part that is formed from a substantially transparent material. The camera lens 22 protects the camera 50 and provides a light path for the exterior field of view of the camera 50.

Situated at the top of the cylinder shaped camera lens 22 is a concave hemispherical dome shaped feature made from transparent material. The inner surface of this hemispherical dome may be coated with a reflective surface 40 with a general reflectivity of at least about 50%. This reflective surface 40 may effectively form a mangin mirror 40 with a substantially hemispherical lens having an at least approximately 50% reflective surface coating on the inside of the camera lens 22. While an at least approximately 50% reflective surface is described, any level of reflectivity may be used. For example, a low level of reflectivity allows the camera 50 to see through the reflective coating and record any image reflected in a 360° panoramic view of the camera. In an example, the camera 50 is mounted at the focal point of both the camera 50 and the mangin mirror 40. This configuration allows the camera 50 to capture a full panoramic hemispherical view of the surrounding area. This configuration creates, in effect, an aperture camera. The camera 50 field of view may be electronically "cropped" to remove any view from above the horizon line not pertinent to the direct function of the camera 50.

A camera lens cleaner 60 may also be provided and may be positioned at the opening of the vehicle sheet metal surface 30. In this way, each time the camera 50 is deployed or retracted, the camera lens 22 is automatically wiped clean. In an example, the camera lens cleaner 60 is formed from is a thin rubber-like blade made from a suitable material. Some example of materials include a rubber material, a polymer material, or a combination of suitable materials for wiping the camera lens 22.

Connected to the camera 50 and extending through the camera holder 70 may be a standard cable connection 80 such as a standard coax cable as used for most commercial cameras. Further, a lift/retract mechanism or drive system includes an electrical motor 90, a pinion gear set 92, and a helix jack-screw 94 which drives the camera module. In this example, the drive system is a jack-screw lift/retract mechanism that allows the camera module to move linearly from the stowed or retracted position to the used, exposed, or deployed position. The electric motor 90 turns the pinion gear 92 that is axially connected to the jack-screw 94 by a threaded central hub. As the electric motor 90 spins, it drives the pinion gear 92. As the pinion gear 92 rotates it moves the jack-screw 94 up or down depending on the direction of rotation. This lifts or retracts the camera module to which it is attached; for example, it lifts or retracts a plate in the camera holder 70 to which the camera 50, the camera lens 22 and the camera cap 10 are attached. In an example, the jack-screw 94 may be split along its axis and a spring clip may be inserted in the void. This allow the jack-screw 94 threads to collapse and slip under manual load and allow for a manual over-ride of the lift/retract mechanism, as needed. The lift/retract mechanism is not limited to the example described. In various other aspect, the drive system could also be pneumatically, hydraulically or electro-mechanically driven to provide a similar actuation.

Figure 6:
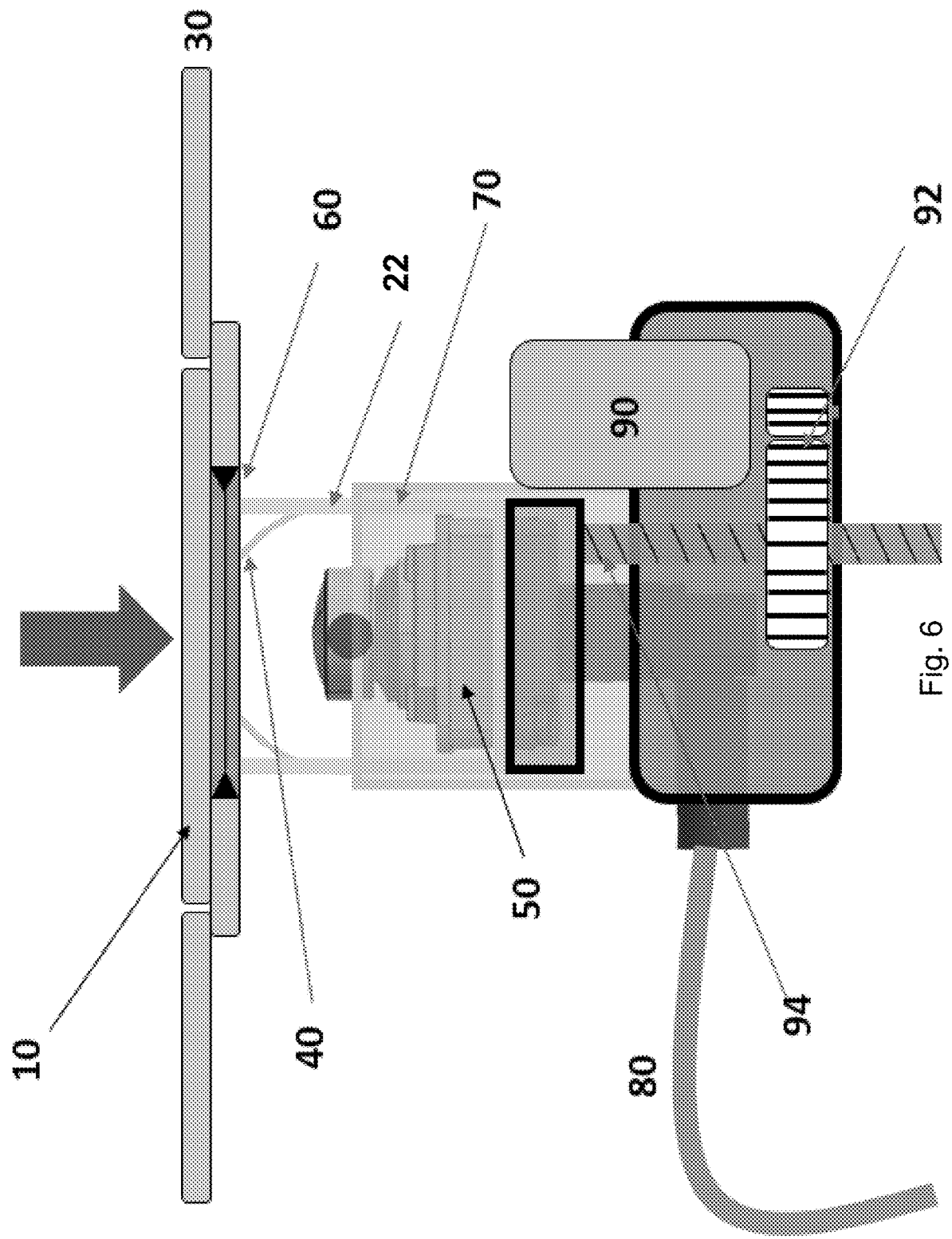
FIG. 6 is a diagram illustrating a schematic view of the camera module of FIGS. 4 and 5 in a retracted position in a vehicle.

FIG. 6 is a diagram illustrating a schematic view of the camera module of FIGS. 4 and 5 in a retracted position in a vehicle.

Referring to FIG. 6, the camera module of FIG. 5 is illustrated in the retracted position with the camera cap 10 being flush with the vehicle sheet metal surface 30. In this position, the camera lens 22 may be completely beneath the position of the camera lens cleaner 60 so that the lens cleaner 60 would clean the entire surface of the lens 22 when the camera 50 is deployed. As described above, the mangin mirror 40 allows the camera 50 to record any image reflected in a 360° panoramic view of the camera 50, and a driving mechanism including the electrical motor 90, the pinion gear 92, and the jack-screw 94 drives movement of the camera 50 within the camera holder 70. A cable 80 extends through the camera holder 70 at a similar position as already described and illustrated for the camera module in the deployed state and in reference with FIG. 6.

Figure 7:
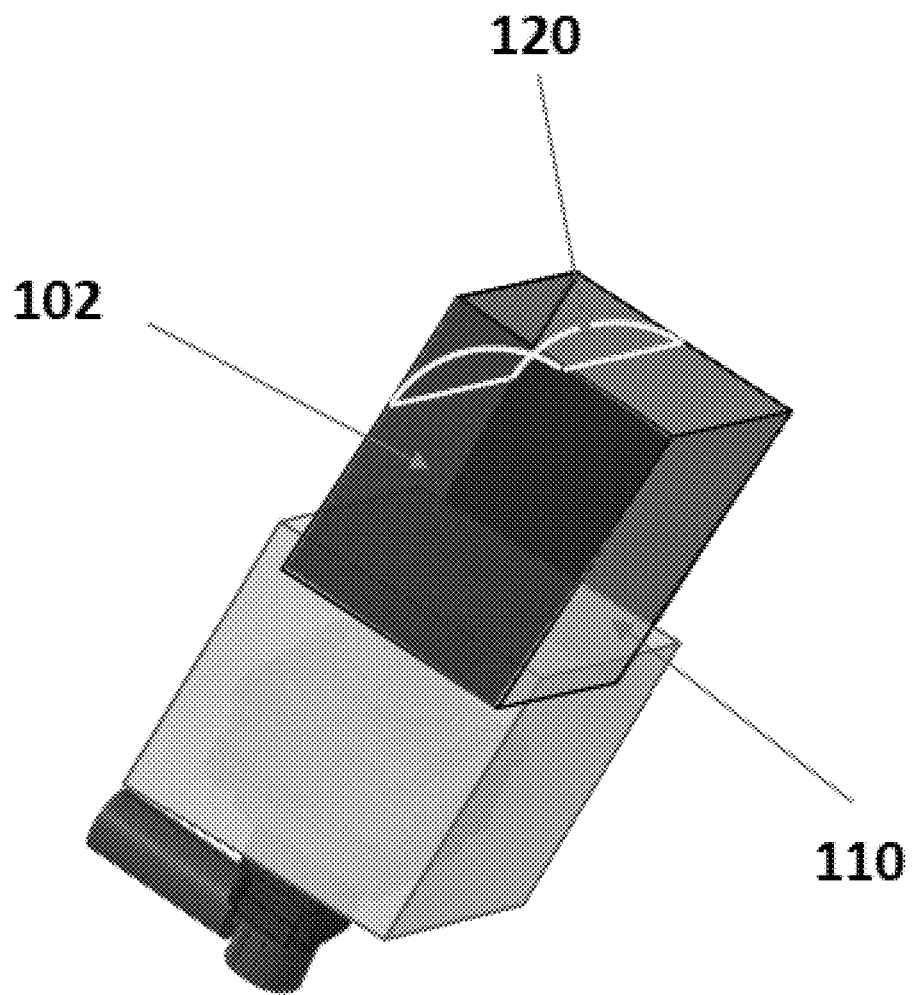
FIG. 7 is a diagram illustrating a perspective view of yet another example of a camera module.

FIG. 7 is a diagram illustrating a perspective view of yet another example of a camera module. In this example, a cube-shaped surface of shields 102 and a lens 110 is provided around the camera. The lens 110 may be similar in transparency and material as the lens 22 described above in reference with the camera module of FIGS. 5 and 6; however, it may form only one side of a cube. The other three sides of the cube may be provided as opaque shields 102 which limit the field of view of the camera to a specific direction. The camera module of this example includes a reflective surface 120 such as a semi-hemispherical mirror to focus the reflected vehicle field of view into the camera aperture so that the camera may capture the reflected image. This is best illustrated in FIG. 8 and described below.

Figure 8:
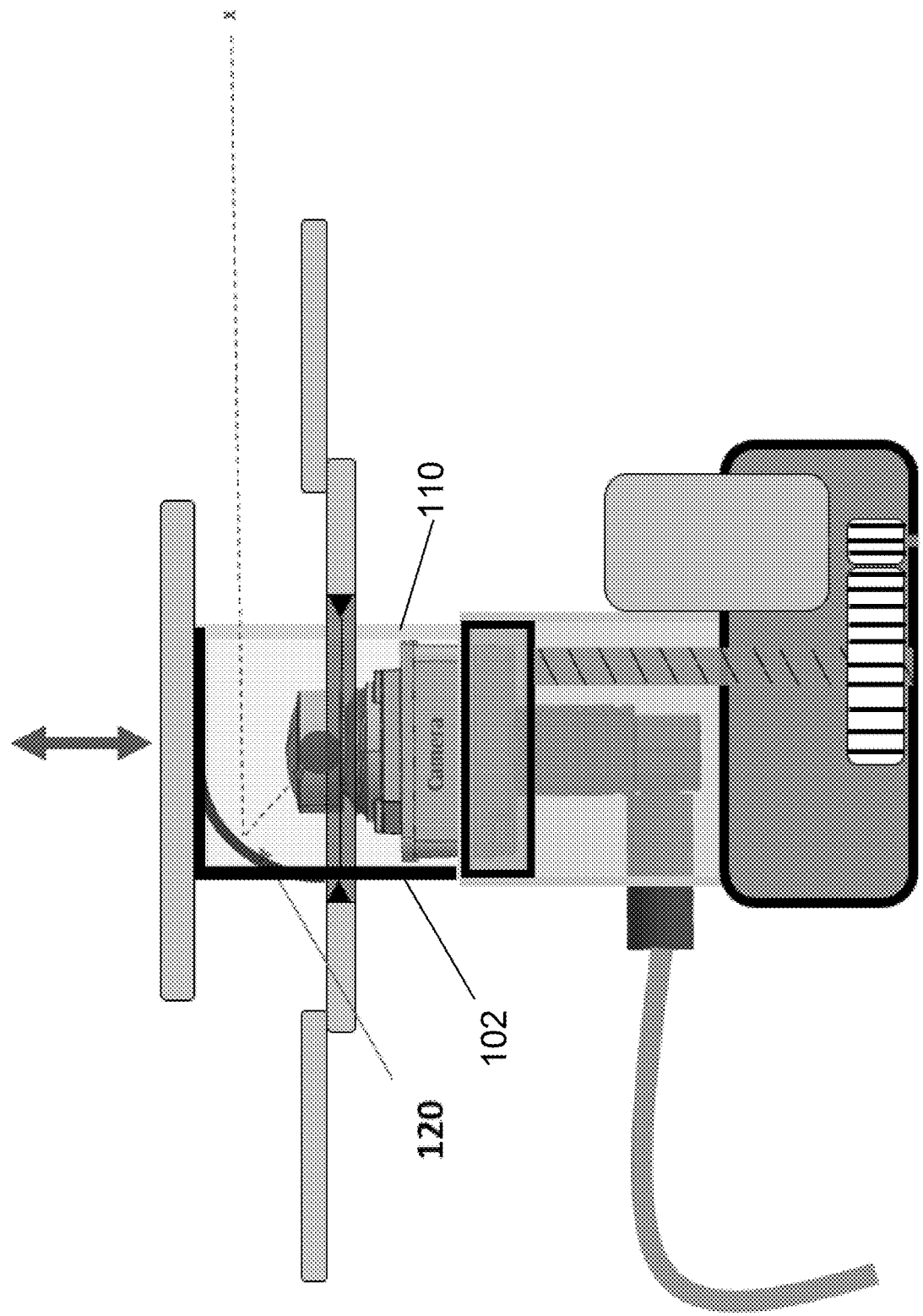
FIG. 8 is a diagram illustrating a schematic view of the camera module of FIG. 7 in a deployed position in a vehicle.

FIG. 8 is a diagram illustrating a schematic view of the camera module of FIG. 7 in a deployed position in a vehicle. The aspect of the camera system already described in the example of FIGS. 5 and 6, such as the drive system, the connection cable, the camera cap, the vehicle sheet metal surface, the camera and camera holder may be the same and are not described again. In this example, the camera module includes the cube-shaped surface of shields 102 and a lens 110 and the reflective surface 120, as already described in reference with FIG. 7. As illustrated in FIG. 8, the reflective surface 120 such as a semi-hemispherical mirror focuses the reflected vehicle field of view into the camera aperture so that the camera captures the reflected image.

Still referring to FIGS. 7 and 8, it should be appreciated that the camera module is not limited to any particular shape. While a cube-shaped surface formed by the shields 102 and lens 110 is described as an example, any other shaped camera module using one or more opaque shields 102 and a reflective surface 120 may be used. For example, the housing of the camera module of FIGS. 7 and 8 may have a cylindrical shape, a triangular shape, a pentagonal shape, among other shapes. In such examples, instead of three sides of the housing being shields 102 and one side being a lens 102, the outer surface of the housing may be at least 30% opaque, at least 35% opaque, at least 40% opaque, at least 45% opaque, at least 50% opaque, at least 55% opaque, at least 65% opaque, at least 70% opaque, at least 75% opaque, at least 80% opaque, at least 85% opaque, or at least 90% opaque. In addition, while a semi-hemispherical mirror is described in the example of FIGS. 7 and 8, the reflective surface may be a hemispherical dome as described above in reference with FIGS. 4-6, i.e. the housing may have opaque surfaces with a reflective surface having the shape of a hemispherical dome. Accordingly, the mangin mirror 40 and all characteristics described above in reference to the manging mirror 40, may be used with this embodiment.

In the above example camera modules, as illustrated in FIGS. 1-8, including each of the embodiments of FIG. 1, FIG. 2, FIG. 4, and FIG. 7, a viewing field of the camera module may correspond to any one or more of a viewing field of a main outer rearview mirror or sideview mirror, a main interior rearview or sideview mirror, a wide-angle mirror, a ramp mirror, or a front mirror of a vehicle.

According to various aspects of the described camera modules, because the actual camera lens is not exposed to the outside environment and the housing lens is cleaned automatically once the camera module is retracted, a clean and clear image can be captured by the camera. In an example, the camera modules may be programmed so that, once a soiled lens is detected by a sensor, a "blinking"

operation is initiated by quickly retracting the camera module and then deploying it to the use position. This would clean the lens of any dirt, debris, or obstructions.

In addition, because the actual camera of the described camera modules is not exposed to the outside environment, a measure of protection to the camera is provided as the unit fully retracts into the vehicle when not in use. This configuration also provides for an aesthetically pleasing appearance when the vehicle is parked and reduces the opportunity for random vandalism or theft of the camera system by making the camera systems inconspicuous when the vehicle is not being driven.

It will be appreciated by those skilled in the art that changes could be made to the embodiments described above without departing from the broad inventive concept thereof. It is understood, therefore, that the invention disclosed herein is not limited to the particular embodiments disclosed, and is intended to cover modifications within the spirit and scope of the present invention.

REFERENCE LIST 1 vehicle body
1' vehicle body
2 camera module body
2' camera module body
3 camera aperture
3' camera aperture
4 optical element
4' optical element
5 static wiper blade
7' push bottom
8' display module
10 camera cap
20 camera module
20' camera module
22 camera lens
30 sheet metal surface
40 reflective surface
50 camera
60 camera lens cleaner
70 camera holder
80 standard cable connection
90 electrical motor
92 pinion gear set
94 helix jack-screw
102 shields
110 lens
120 reflective surface

What is claimed is:

1. A camera module for use in a vehicle, comprising:
a camera for capturing a surrounding of the vehicle, and which is configured to move from a retracted position to a deployed position;
a camera lens forming a housing or part of the housing around the camera;
a camera holder which carries the camera and the surrounding camera lens;
a camera cap which is configured to be flush with a vehicle surface in response to the camera being in the retracted position so that the camera is completely retracted beneath the vehicle surface; and
a drive system comprising a motor for moving the camera from the retracted position to the deployed position or from the deployed position to the retracted position.

2. The camera module of claim 1, further comprising a camera lens cleaner which is fixed in an opening of the vehicle surface so that the camera lens is cleaned as the camera moves from the retracted position to the deployed position or from the deployed position to the retracted position.

3. The camera module of claim 1, wherein in response to dirt, debris, or obstruction being detected, the drive system actuates a blinking motion in which the camera module is moved to the retracted position and subsequently returned to the deployed position.

4. The camera module of claim 1, wherein the camera lens forms the housing or part of the housing around the camera and has a substantially cylindrical shape comprising a concave hemispherical dome or a semi-hemispherical surface at a top of the housing.

5. The camera module of claim 4, further comprising a substantially reflective material on the hemispherical dome or the semi-hemispherical surface having at least 50% reflectivity and forming a mangin mirror.

6. The camera module of claim 4, wherein a focal point of the camera is located at a focal point of the mangin mirror so that the camera captures a 360 degree view of the surrounding of the vehicle.

7. The camera module of claim 1, wherein the field of view of the camera is electronically cropped before being displayed in the vehicle to remove regions of a captured view.

8. The camera module of claim 1, wherein the drive system further comprises a pinion gear which is driven by the motor, and a jack-screw which is driven by the pinion gear and axially moves the camera from the retracted position to the deployed position or from the deployed position to the retracted position.

9. The camera module of claim 2, wherein the camera lens cleaner comprises at least one of a circular, square, triangular, or pentagonal shape and is formed of at least one of rubber or polymer material.

10. The camera module of claim 1, wherein the housing around the camera has a substantially cube shape, the camera lens forms one side of the housing around the camera, and the camera module further comprises opaque shields which form three sides of the housing around the camera.

11. The camera module of claim 10, further comprising a substantially reflective material on a top surface of the housing around the camera having at least 50% reflectivity.

12. A camera module for use in a vehicle, comprising:
a camera for capturing an image surrounding the vehicle, and which is configured to move from a retracted position to a deployed position;
a camera lens forming a housing around the camera;
a camera holder which carries the camera and the surrounding camera lens;
a camera lens cleaner which is fixed in an opening of the vehicle surface so that the camera lens is cleaned as the camera moves from the retracted position to the deployed position or from the deployed position to the retracted position; and
a drive system comprising a motor for moving the camera from the retracted position to the deployed position or from the deployed position to the retracted position.

13. The camera module of claim 12, further comprising a camera cap which is configured to be flush with the vehicle surface in response to the camera being in the retracted position so that the camera is completely retracted beneath the vehicle surface.

14. The camera module of claim 12, wherein in response to dirt, debris, or obstruction being detected, the drive system actuates a blinking motion in which the camera module is moved to the retracted position and subsequently returned to the deployed position.

15. The camera module of claim 12, wherein the camera lens forms the housing or part of the housing around the camera and has a substantially cylindrical shape comprising a concave hemispherical dome or a semi-hemispherical surface at a top of the housing.

16. The camera module of claim 15, further comprising a substantially reflective material on the hemispherical dome or the semi-hemispherical surface having at least 50% reflectivity and forming a mangin mirror.

17. The camera module of claim 15, wherein a viewing field of the camera module corresponds to one or more of a viewing field of a main outer rearview mirror, a main outer sideview mirror, a main interior rearview mirror, a main interior sideview mirror, a wide-angle mirror, a ramp mirror, or a front mirror of a vehicle.

18. The camera module of claim 17, wherein the field of view of the camera is electronically cropped before being displayed in the vehicle to remove regions of a captured view.

19. The camera module of claim 12, wherein the drive system further comprises a pinion gear which is driven by the motor, and a jack-screw which is driven by the pinion gear and axially moves the camera from the retracted position to the deployed position or from the deployed position to the retracted position.

20. The camera module of claim 12, wherein the camera lens cleaner comprises at least one of a circular, square, triangular, or pentagonal shape and is formed of at least one of rubber or polymer material.

21. The camera module of claim 12, wherein the housing around the camera has a substantially cube shape, the camera lens forms one side of the housing around the camera, and the camera module further comprises opaque shields which form three sides of the housing around the camera.

22. The camera module of claim 21, further comprising a substantially reflective material on a top surface of the housing around the camera having at least 50% reflectivity.

23. The camera module of claim 1, wherein a viewing field of the camera module corresponds to one or more of a viewing field of a main outer rearview mirror, a main outer sideview mirror, a main interior rearview mirror, a main interior sideview mirror, a wide-angle mirror, a ramp mirror, or a front mirror of a vehicle.

24. The camera module of claim 1, wherein the housing around the camera comprises at least one of an opaque shield and a substantially reflective material on a surface.

25. The camera module of claim 12, wherein the housing around the camera comprises at least one of an opaque shield and a substantially reflective material on a surface.

26. A camera module for use in a vehicle, comprising:
a camera for capturing a surrounding of the vehicle, and which is configured to move from a retracted position to a deployed position;
a camera lens forming a housing or part of the housing around the camera;
a camera holder which carries the camera and the surrounding camera lens;
a camera cap which is configured to be flush with a vehicle surface in response to the camera being in the retracted position so that the camera is completely retracted beneath the vehicle surface; and
a drive system comprising a motor for moving the camera from the retracted position to the deployed position or from the deployed position to the retracted position,
wherein the housing around the camera comprises at least one of an opaque shield and a substantially reflective material on a surface.

* * * * *